United States Patent
Itogawa

(10) Patent No.: US 8,922,819 B2
(45) Date of Patent: Dec. 30, 2014

(54) IMAGE RECORDING SYSTEM, IMAGE RECORDING APPARATUS, NON-TRANSITORY STORAGE MEDIUM STORING INSTRUCTIONS EXECUTABLE BY IMAGE RECORDING APPARATUS, MOBILE TERMINAL, NON-TRANSITORY STORAGE MEDIUM STORING INSTRUCTIONS EXECUTABLE BY MOBILE TERMINAL, AND METHOD OF CONTROLLING IMAGE RECORDING SYSTEM

(71) Applicant: Yoshihiro Itogawa, Mizuho (JP)

(72) Inventor: Yoshihiro Itogawa, Mizuho (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/193,167

(22) Filed: Feb. 28, 2014

(65) Prior Publication Data

US 2014/0240777 A1    Aug. 28, 2014

(30) Foreign Application Priority Data

Feb. 28, 2013   (JP) ................................. 2013-039793

(51) Int. Cl.
   *G06F 3/12*   (2006.01)
   *G06K 15/00*  (2006.01)
   *H04N 1/00*   (2006.01)

(52) U.S. Cl.
   CPC ............ *G06F 3/1258* (2013.01); *G06F 3/1292* (2013.01)
   USPC .......... 358/1.15; 358/1.16; 358/401; 358/402

(58) Field of Classification Search
   USPC ......... 358/1.1, 1.15, 1.14, 1.16, 1.6, 1.9, 402, 358/401; 455/39, 41.1, 41.2, 151.1, 73, 455/991, 95, 553.1, 556.2
   See application file for complete search history.

(56) References Cited

U.S. PATENT DOCUMENTS

| | | | |
|---|---|---|---|
| 2009/0036056 A1* | 2/2009 | Oshima et al. | ............... 455/41.3 |
| 2010/0081383 A1 | 4/2010 | Takeda | |
| 2010/0245903 A1 | 9/2010 | Sakakibara | |
| 2011/0116125 A1 | 5/2011 | Park | |
| 2011/0292445 A1* | 12/2011 | Kato | ............................ 358/1.15 |
| 2012/0250059 A1* | 10/2012 | Itogawa et al. | ............... 358/1.13 |

FOREIGN PATENT DOCUMENTS

| | | |
|---|---|---|
| JP | 2010-081408 A | 4/2010 |
| JP | 2010-241114 A | 10/2010 |

* cited by examiner

*Primary Examiner* — Ngon Nguyen
(74) *Attorney, Agent, or Firm* — Merchant & Gould PC

(57) ABSTRACT

An image recording system includes: a mobile terminal and an image recording apparatus. The mobile terminal and the image recording apparatus transfer communication setting information about the mobile terminal or the image recording apparatus over a first wireless communication. The mobile terminal transmits image data to the image recording apparatus over a second wireless communication. Each time when the first wireless communication is established, the mobile terminal obtains a signal relating to its position. The mobile terminal or the image recording apparatus creates change information about a change of the position based on a plurality of the signals and sets, based on the change information, at least one setting value respectively for at least one setting item relating to image recording. The image recording apparatus records an image on a recording medium based on the received image data and based on the set at least one setting value.

11 Claims, 10 Drawing Sheets

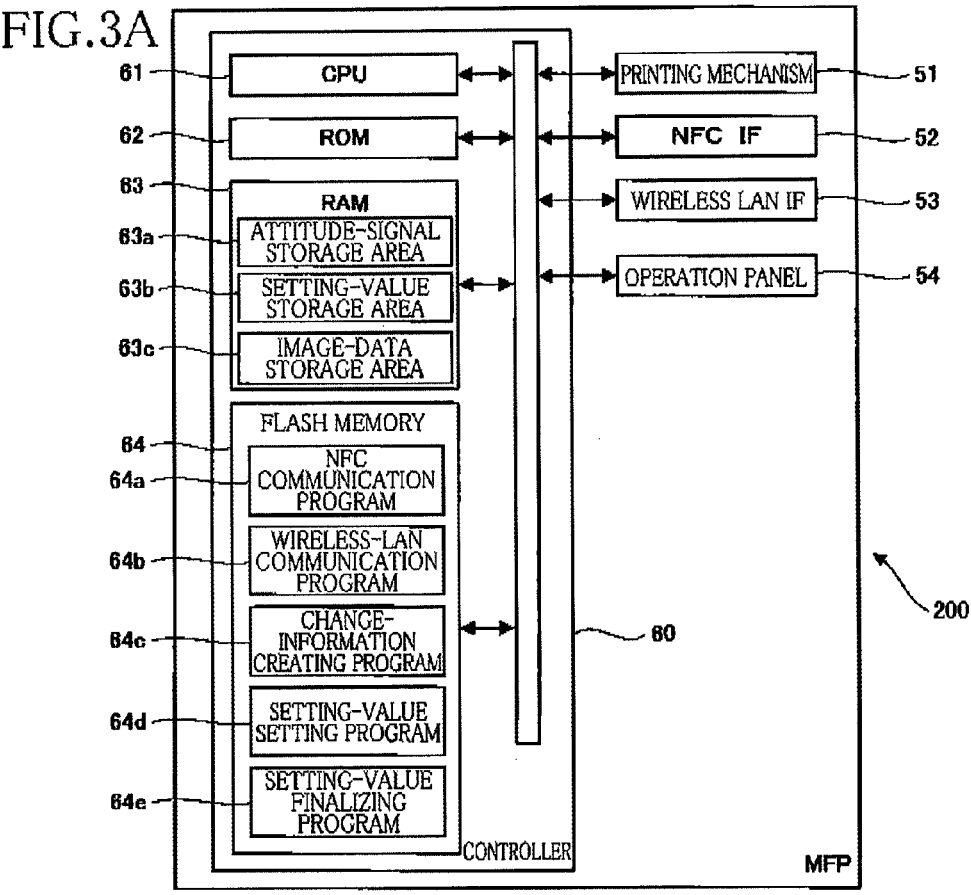

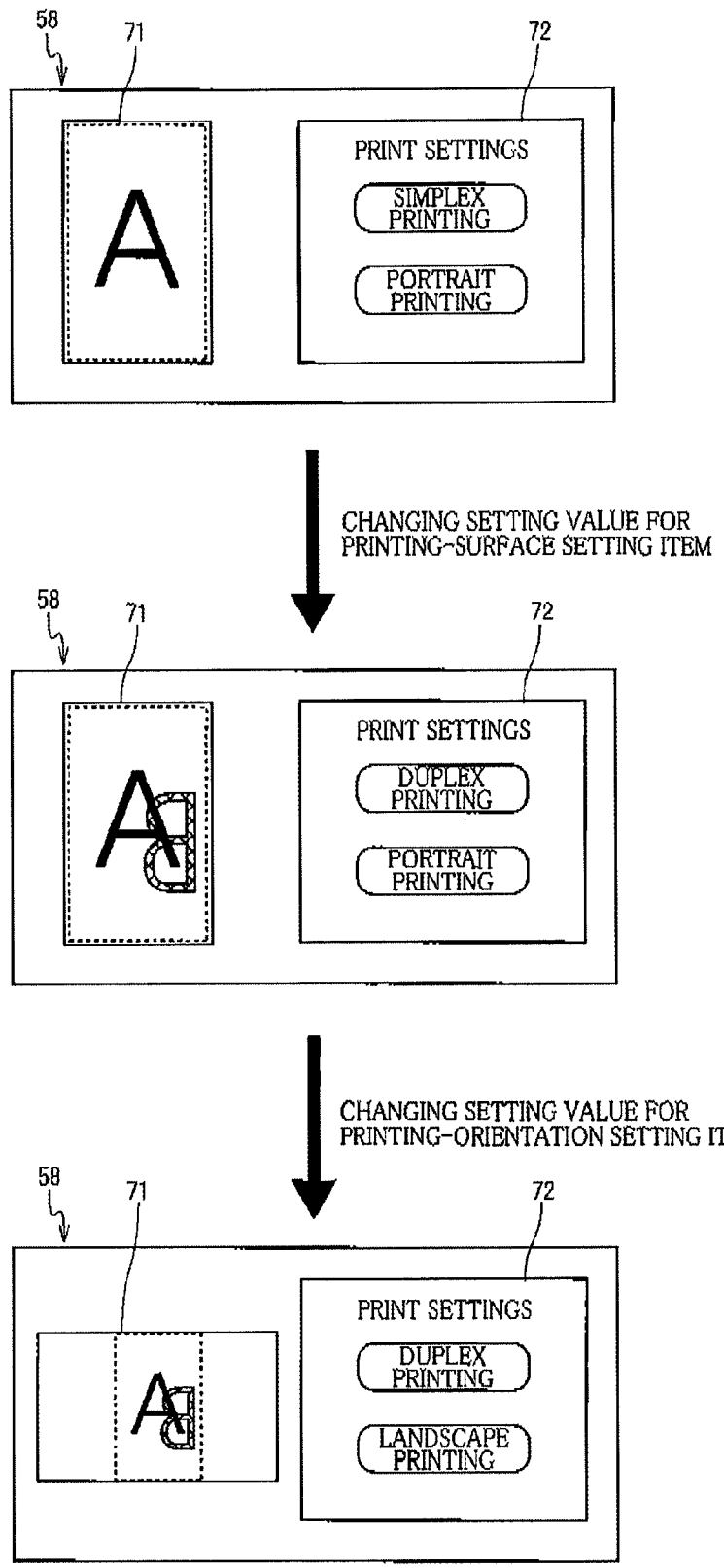

IMAGE RECORDING SYSTEM, IMAGE RECORDING APPARATUS, NON-TRANSITORY STORAGE MEDIUM STORING INSTRUCTIONS EXECUTABLE BY IMAGE RECORDING APPARATUS, MOBILE TERMINAL, NON-TRANSITORY STORAGE MEDIUM STORING INSTRUCTIONS EXECUTABLE BY MOBILE TERMINAL, AND METHOD OF CONTROLLING IMAGE RECORDING SYSTEM

CROSS REFERENCE TO RELATED APPLICATION

The present application claims priority from Japanese Patent Application No. 2013-039793, which was filed on Feb. 28, 2013, the disclosure of which is herein incorporated by reference in its entirety.

BACKGROUND OF THE INVENTION

1. Field of the Invention

The present invention relates to an image recording system, an image recording apparatus, a non-transitory storage medium storing a plurality of instructions executable by a computer of the image recording apparatus, a mobile terminal, a non-transitory storage medium storing a plurality of instructions executable by a computer of the mobile terminal, and a method of controlling the image recording system.

2. Description of the Related Art

There is known an image recording system in which image data stored in a mobile terminal is transmitted to an image recording apparatus, and the image recording apparatus prints an image based on the received image data. For example, there is known an image recording system including a mobile terminal or a mobile device and an image recording apparatus or a multi-function peripheral which can perform data communication therebetween according to two wireless communication standards. In this image recording system, when communication according to a first wireless communication standard is established, communication setting information and function setting information are transmitted from the mobile terminal to the image recording apparatus. The image recording apparatus then uses the received communication setting information to establish communication according to a second wireless communication standard and receives the image data from the mobile terminal over the communication according to the second wireless communication standard. The image recording apparatus thereafter prints an image based on the received image data and based on the function setting information received over the communication according to the first wireless communication standard.

SUMMARY OF THE INVENTION

Incidentally, the above-described image recording system requires a user to use a mobile terminal to set function setting information using operation buttons of the mobile terminal, resulting in low operability. In particular, a small-sized mobile terminal tends to have small-sized operation buttons, leading to much lower operability.

This invention has been developed to provide an image recording system, an image recording apparatus, a non-transitory storage medium storing a plurality of instructions executable by a computer of the image recording apparatus, a mobile terminal, a non-transitory storage medium storing a plurality of instructions executable by a computer of the mobile terminal, and a method of controlling the image recording system, each capable of improving operability for a user.

The present invention provides an image recording system including: a mobile terminal; and an image recording apparatus configured to record an image on a recording medium. The mobile terminal includes: a storage device configured to store image data; a mobile-terminal first communication device configured to perform data communication with the image recording apparatus over first wireless communication which is established when a distance between the mobile terminal and the image recording apparatus is equal to or less than a communicable distance; a mobile-terminal second communication device configured to perform data communication with the image recording apparatus over second wireless communication which is established based on communication setting information about the mobile terminal and the image recording apparatus; a position detector configured to output a signal representative of a position of the mobile terminal; and a mobile-terminal controller. The mobile-terminal controller is configured to: perform at least one of transmitting the communication setting information about the mobile terminal over the first wireless communication and receiving the communication setting information about the image recording apparatus over the first wireless communication; and transmit the image data stored in the storage device to the image recording apparatus over the second wireless communication. The image recording apparatus includes: a recording device configured to record an image on the recording medium based on the image data; an image-recording-apparatus first communication device configured to perform data communication with the mobile terminal over the first wireless communication; an image-recording-apparatus second communication device configured to perform data communication with the mobile terminal over the second wireless communication; and an image-recording-apparatus controller. The image-recording-apparatus controller is configured to perform at least one of receiving, over the first wireless communication, the communication setting information about the mobile terminal which is transmitted by the control of the mobile-terminal controller and transmitting, over the first wireless communication, the communication setting information about the image recording apparatus which is to be received by the control of the mobile-terminal controller. The mobile-terminal controller is configured to, each time when the first wireless communication is established, obtain the signal relating to the position of the mobile terminal which is output from the position detector. One of the mobile-terminal controller and the image-recording-apparatus controller is configured to: create change information representative of a change of the position of the mobile terminal, based on a plurality of the signals obtained by the mobile-terminal controller; and based on the created change information, set at least one setting value respectively for at least one setting item relating to the image recording of the image recording apparatus. The image-recording-apparatus controller is configured to control the recording device to record an image on the recording medium based on the image data received over the second wireless communication and based on the set at least one setting value respectively for the at least one setting item.

The present invention also provides an image recording apparatus including: a recording device configured to record an image on a recording medium based on image data; a first communication device configured to perform data communication with a mobile terminal over first wireless communication which is established when a distance between a transmitter device and a receiver device is equal to or less than a communicable distance; a second communication device configured to perform data communication with the mobile terminal over second wireless communication which is established based on communication setting information about a transmitter device and a receiver device; and a controller. The controller is configured to: perform at least one of receiving, over the first wireless communication, communication setting information about the mobile terminal which is transmitted by the control of the controller and transmitting communication setting information about the image recording apparatus over the first wireless communication; each time when the first wireless communication is established, receive a signal relating to a position of the mobile terminal over the first wireless communication; based on a plurality of the received signals, create change information representative of a change of the position of the mobile terminal; based on the created change information, set at least one setting value respectively for at least one setting item relating to the image recording of the image recording apparatus; and control the recording device to record an image on the recording medium based on the image data received from the mobile terminal over the second wireless communication and based on the set at least one setting value.

The present invention also provides a non-transitory storage medium storing a plurality of instructions executable by a computer of an image recording apparatus. The image recording apparatus includes: a recording device configured to record an image on a recording medium based on image data; a first communication device configured to perform data communication with a mobile terminal over first wireless communication which is established when a distance between a transmitter device and a receiver device is equal to or less than a communicable distance; a second communication device configured to perform data communication with the mobile terminal over second wireless communication which is established based on communication setting information about a transmitter device and a receiver device; and the plurality of instructions. The plurality of instructions, when executed by the computer, cause the image recording apparatus to execute: perform at least one of receiving, over the first wireless communication, communication setting information about the mobile terminal and transmitting communication setting information about the image recording apparatus over the first wireless communication; each time when the first wireless communication is established, receive a signal relating to a position of the mobile terminal over the first wireless communication; based on a plurality of the received signals, create change information representative of a change of the position of the mobile terminal; based on the created change information, set at least one setting value respectively for at least one setting item relating to the image recording of the image recording apparatus; and control the image recording apparatus to record an image on the recording medium based on the image data received from the mobile terminal over the second wireless communication and based on the set at least one setting value.

The present invention also provides a mobile terminal including: a storage device configured to store image data; a first communication device configured to perform data communication with an image recording apparatus over first wireless communication which is established when a distance between a transmitter device and a receiver device is equal to or less than a communicable distance; a second communication device configured to perform data communication with the image recording apparatus over second wireless communication which is established based on communication setting information about a transmitter device and a receiver device; a position detector configured to output a signal representative of a position of the mobile terminal; and a controller. The controller is configured to: perform at least one of transmitting communication setting information about the mobile terminal over the first wireless communication and receiving communication setting information about the image recording apparatus over the first wireless communication; transmit the image data stored in the storage device to the image recording apparatus over the second wireless communication; each time when the first wireless communication is established, obtain a signal relating to a position of the mobile terminal which is output from the position detector; based on a plurality of the obtained signals, create change information representative of a change of the position of the mobile terminal; based on the created change information, set at least one setting value respectively for at least one setting item relating to the image recording of the image recording apparatus; and transmit the set at least one setting value respectively for the at least one setting item to the image recording apparatus over one of the first wireless communication and the second wireless communication.

The present invention also provides a non-transitory storage medium storing a plurality of instructions executable by a computer of a mobile terminal. The mobile terminal includes: a storage device configured to store image data; a first communication device configured to perform data communication with an image recording apparatus over first wireless communication which is established when a distance between a transmitter device and a receiver device is equal to or less than a communicable distance; a second communication device configured to perform data communication with the image recording apparatus over second wireless communication which is established based on communication setting information about a transmitter device and a receiver device; and a position detector configured to output a signal representative of a position of the mobile terminal. The plurality of instructions, when executed by the computer, cause the mobile terminal to: perform at least one of transmitting communication setting information about the mobile terminal over the first wireless communication and receiving communication setting information about the image recording apparatus over the first wireless communication; transmit the image data stored in the storage device to the image recording apparatus over the second wireless communication; each time when the first wireless communication is established, obtain a signal relating to a position of the mobile terminal which is output from the position detector; based on a plurality of the obtained signals, create change information representative of a change of the position of the mobile terminal; based on the created change information, set at least one setting value respectively for at least one setting item relating to the image recording of the image recording apparatus; and transmit the set at least one setting value respectively for the at least one setting item to the image recording apparatus over one of the first wireless communication and the second wireless communication.

The present invention also provides a method of controlling an image recording system including a mobile terminal and an image recording apparatus configured to record an image on a recording medium. The mobile terminal includes: a storage device configured to store image data; a mobile-terminal first communication device configured to perform data communication with the image recording apparatus over first wireless communication which is established when a distance between the mobile terminal and the image recording apparatus is equal to or less than a communicable distance; a mobile-terminal second communication device configured to perform data communication with the image recording apparatus over second wireless communication which is established based on communication setting information about the mobile terminal and the image recording apparatus; and a position detector configured to output a signal representative of a position of the mobile terminal. The image recording apparatus includes: a recording device configured to record an image on the recording medium based on the image data; an image-recording-apparatus first communication device configured to perform data communication with the mobile terminal over the first wireless communication; and an image-recording-apparatus second communication device configured to perform data communication with the mobile terminal over the second wireless communication. The method includes: executing a communication-setting-information transmitting processing in which the mobile-terminal first communication device and the image-recording-apparatus first communication device are controlled to perform at least one of transmitting the communication setting information about the mobile terminal from the mobile terminal to the image recording apparatus over the first wireless communication and transmitting the communication setting information about the image recording apparatus from the image recording apparatus to the mobile terminal over the first wireless communication; executing an image-data transmitting processing in which the mobile-terminal second communication device and the image-recording-apparatus second communication device are controlled to transmit the image data stored in the storage device from the mobile terminal to the image recording apparatus over the second wireless communication; executing a signal obtaining processing in which the signal relating to the position of the mobile terminal which is output from the position detector is obtained each time when the first wireless communication is established; executing a setting processing in which change information representative of a change of the position of the mobile terminal is created based on a plurality of the signals obtained in the signal obtaining processing, and at least one setting value respectively for at least one setting item relating to the image recording of the image recording apparatus is set based on the created change information; and executing an image recording processing in which the recording device is controlled to record an image on the recording medium based on the image data transmitted from the mobile terminal to the image recording apparatus in the image-data transmitting processing and based on the at least one setting value set in the setting processing.

BRIEF DESCRIPTION OF THE DRAWINGS

The objects, features, advantages, and technical and industrial significance of the present invention will be better understood by reading the following detailed description of the embodiments of the invention, when considered in connection with the accompanying drawings, in which:

FIG. 3A is a block diagram illustrating an electric configuration of a multi-function peripheral (MFP) illustrated in FIG. 1, FIG. 3B is a view illustrating a printing-surface change table, FIG. 3C is a view illustrating a printing-orientation change table, and FIG. 3D is a view illustrating a setting-value finalizing table;

FIG. 5 is a view illustrating images displayed on a display of an operation panel of the MFP illustrated in FIG. 1;

DETAILED DESCRIPTION OF THE EMBODIMENTS

First Embodiment

Overall Configuration of Image Recording System

Figure 1:
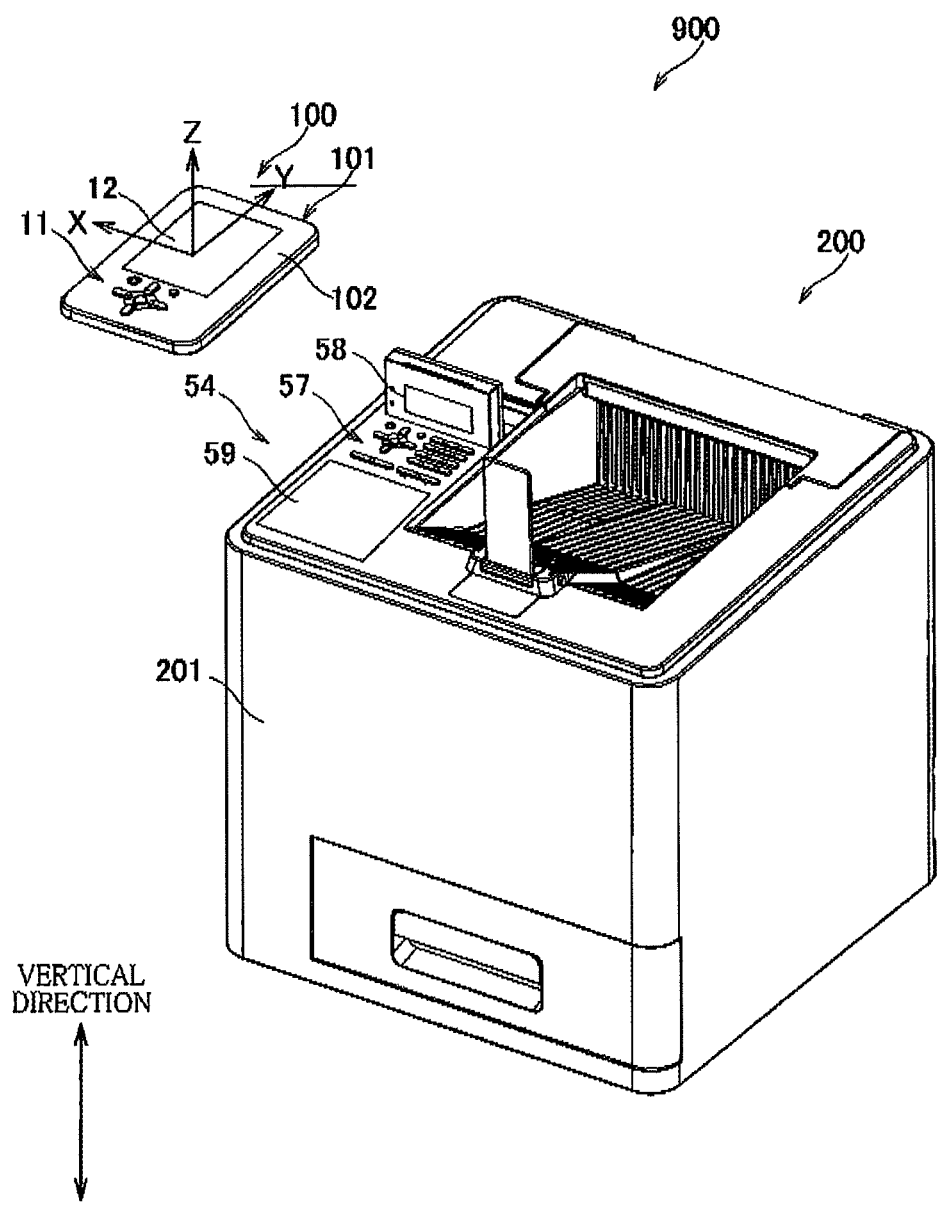
FIG. 1 is an external perspective view illustrating an image recording system according to a first embodiment.

Hereinafter, there will be described an image recording system according to a first embodiment of the present invention by reference to the drawings. As illustrated in FIG. 1, an image recording system 900 according to the present embodiment includes: a multi-function peripheral (MFP) 200 as one example of an image recording apparatus having a printing function and an image reading function (that is, the MFP 200 includes a scanner); and a mobile terminal 100 configured to output image data to be printed by the MFP.

The printing function allows the MFP 200 to perform duplex printing for printing images on both sides (surfaces) of a recording medium in the form of a sheet. The mobile terminal 100 is a mobile device such as a mobile phone and a personal digital assistant (PDA). The mobile terminal 100 can transmit and receive data to and from the MFP 200 over wireless communication according to the NFC (Near Field Communication) as one example of first wireless communication and a wireless communication according to the Wi-Fi (Wireless Fidelity) direct standard as one example of second wireless communication.

The wireless communication according to the NFC standard (hereinafter referred to as "NFC communication") is wireless communication having a very short communicable distance or range of, e.g., about 10 cm. The NFC communication is established by touching the mobile terminal 100 and the MFP 200 together or bringing them into close proximity. A communication speed in the NFC communication is slower than that in the wireless communication according to the Wi-Fi direct standard (hereinafter referred to as "WFD communication"), and accordingly the NFC communication is used for communication of a relatively small amount of data. It is noted that the short communicable distance of the NFC communication facilitates identifying a communication partner or device, and accordingly communication can be established more easily in the NFC communication than in the WFD communication. That is, the user needs to bring the mobile terminal 100 near the MFP 200 as the communication partner, but this operation itself designates the communication partner.

The WFD communication is local wireless communication having a communicable distance or range which is generally ranged between several meters and several tens of meters. Here, the WFD communication establishes a network on which data can be transferred. Thus, a WFD network needs to be established for data communication between a transmitter device and a receiver device. In the image recording system 900 according to the present embodiment, when NFC communication is established between the mobile terminal 100 and the MFP 200, WFD connection information (as one example of communication setting information) for establishing WFD communication is transferred between the mobile terminal 100 and the MFP 200. The WFD communication between the mobile terminal 100 and the MFP 200 is established based on this WFD connection information (that is, what is called a handover is performed).

Structure of Mobile Terminal

There will be next explained an overall structure of the mobile terminal 100. As illustrated in FIG. 1, the mobile terminal 100 includes a generally rectangular parallelepiped housing 101. One of six faces of the housing 101 is a rectangular face on which operation keys 11 and a touch panel 12 are arranged along a longitudinal direction of the one face. Hereinafter, the face on which the operation keys 11 and the touch panel 12 are arranged will be referred to as "reference face 102". Also, one of the six faces of the housing 101 which is parallel to the reference face 102 will be referred to as "back face 103" (see FIG. 4A) which is opposite the reference face 102. Also, reference coordinates for the mobile terminal 100 are defined by the X axis, the Y axis, and the Z axis which are perpendicular to each other. The X axis extends in a widthwise direction of the reference face 102, and a positive direction of the X axis extends in a predetermined direction. The Y axis extends along a longitudinal direction of the reference face 102, and a positive direction of the Y axis extends in a direction directed from the operation keys 11 to the touch panel 12. The Z axis extends perpendicularly to the reference face 102, and a positive direction of the Z axis extends in a direction directed from the back face 103 to the reference face 102.

Figure 2:
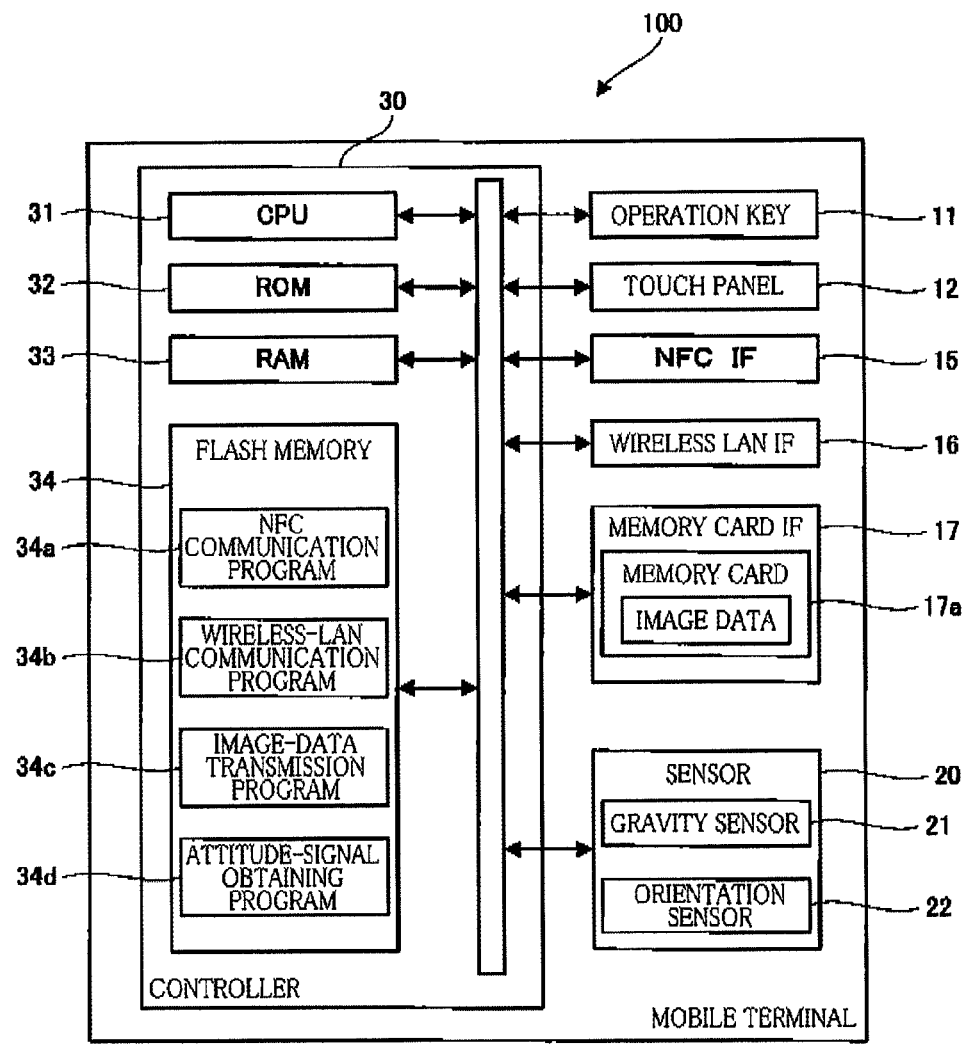
FIG. 2 is a block diagram illustrating an electric configuration of a mobile terminal illustrated in FIG. 1.

As illustrated in FIG. 2, the mobile terminal 100 includes: an NFC interface 15 (as one example of a mobile-terminal first communication device) and a wireless LAN interface 16 (as one example of a mobile-terminal second communication device) as communication interfaces for allowing the mobile terminal 100 to communicate with an external device; a memory card interface 17 on which a memory card 17a (as one example of a storage) can be removably mounted; a sensor 20 for outputting a signal representative of an attitude or a position of the mobile terminal 100 (hereinafter may be referred to as "attitude signal"); and a controller 30 for controlling operations of the mobile terminal 100. The memory card 17a stores image data owned by the user such as document files and data representative of photographs. It is noted that the image data may be stored in a flash memory 34 (which will be described later) of the mobile terminal 100.

The NFC interface 15 allows the mobile terminal 100 to perform NFC communication according to the ISO/IEC 21481 standard or the ISO/IEC 18092 standard. The mobile terminal 100 uses the NFC interface 15 to transmit and receive data to and from an external device over NFC communication. The wireless LAN interface 16 allows the mobile terminal 100 to perform WFD communication according to IEEE 802.11 standard or any standard equivalent thereto. The mobile terminal 100 uses the wireless LAN interface 16 to transmit and receive data to and from an external device over WFD communication.

The sensor 20 is constituted by a gravity sensor 21 and an orientation sensor 22 and outputs the attitude signal representative of the attitude of the mobile terminal 100. Here, the attitude signal includes: a lower face signal representative of a face of the six faces of the housing 101 which is facing downward in the vertical direction (hereinafter simply referred to as "lower face"); and an orientation signal representative of an orientation of the mobile terminal 100, i.e., a direction in which the mobile terminal 100 is facing.

The gravity sensor 21 is a sensor for outputting a lower face signal. In the present embodiment, the gravity sensor 21 is constituted by a triaxial acceleration sensor, and the three axes respectively coincide with the X axis, the Y axis, and the Z axis of the reference coordinates for the mobile terminal 100. Based on acceleration in each of the three axes of the triaxial acceleration sensor, the gravity sensor 21 senses a gravity direction of the mobile terminal 100 to detect which one of the six faces of the housing 101 is facing downward in the vertical direction. Based on a result of this detection, the gravity sensor 21 outputs a lower face signal.

The orientation sensor 22 is a sensor for outputting an orientation signal. In the present embodiment, the orientation sensor 22 detects the true north based on a radio wave received from a GPS satellite. The orientation sensor 22 detects an orientation of the mobile terminal 100 based on an angle, with respect to the true north, of a vector obtained by projecting the positive direction of the Y axis of the mobile terminal 100 onto the horizontal plane. Based on a result of this detection, the orientation sensor 22 outputs an orientation signal. It is noted that the orientation sensor 22 may detect the orientation of the mobile terminal 100 using magnetic north.

There will be next explained the controller 30 of the mobile terminal 100. As illustrated in FIG. 2, the controller 30 includes a CPU 31, a ROM 32, a RAM 33, and the flash memory 34. The ROM 32 stores various settings and firmware as control programs for controlling the mobile terminal 100. The RAM 33 and the flash memory 34 are used as a working area from which the control programs are read or as a storage area for temporarily storing data.

The flash memory 34 stores the WFD connection information for establishing WFD communication with the MFP 200. This WFD connection information includes: a service set identifier (SSID) for identifying the WFD network; a password; and information unique to the mobile terminal 100 such as an IP address. On the flash memory 34 are installed various programs such as an OS and device drivers for controlling various devices. The flash memory 34 also stores various applications for causing the mobile terminal 100 to execute its function. These applications include: an NFC communication program 34a for causing the mobile terminal 100 to perform NFC communication using the NFC interface 15; a wireless-LAN communication program 34b for causing the mobile terminal 100 to perform WFD communication using the wireless LAN interface 16; an image-data transmission program 34c; and an attitude-signal obtaining program 34d.

The image-data transmission program 34c is designed to cause the mobile terminal 100 to use WFD communication to transmit image data to be printed which is selected by the user, to the MFP 200 via the wireless-LAN communication program 34b. The attitude-signal obtaining program 34d is designed to, each time when the NFC communication is established between the mobile terminal 100 and the MFP 200, obtain an attitude signal being output from the sensor 20 upon the establishment of the NFC communication and transmit the obtained attitude signal to the MFP 200 over the NFC communication.

The CPU 31 executes various processings while storing results of calculations into the RAM 33 or the flash memory 34 according to the control programs read from the ROM 32 and the programs read from the flash memory 34. The CPU 31 also controls the above-described applications.

Structure of MFP

There will be next explained an overall structure of the MFP 200. As illustrated in FIG. 1, the MFP 200 includes a generally rectangular parallelepiped housing 201. As illustrated in FIG. 3A, the MFP 200 includes: a printing mechanism 51 (as one example of a recording device) for printing an image on a sheet; an NFC interface 52 (as one example of an image-recording-apparatus first communication device); a wireless LAN interface 53 (as one example of an image-recording-apparatus second communication device); an operation panel 54 for displaying an operating state and receiving or accepting an input operation of the user; and a controller 60 for controlling operations of the MFP 200.

Like the NFC interface 15 of the mobile terminal 100, the NFC interface 52 is an interface which allows the MFP 200 to perform NFC communication. Like the wireless LAN interface 16 of the mobile terminal 100, the wireless LAN interface 53 is an interface which allows the MFP 200 to perform WFD communication.

As illustrated in FIG. 1, the operation panel 54 is provided on an upper face of the housing 201 and includes: an input unit 57 for receiving or accepting an input of the user; a display 58 for displaying messages and settings; and an NFC reading surface 59 for establishing NFC communication. This NFC reading surface 59 is a component of the NFC interface 52 and extends parallel to the horizontal plane. While a power of the MFP 200 is ON, the MFP 200 can detect a device capable of performing NFC communication, based on a signal transmitted from the NFC interface 52. In the present embodiment, when the user has brought the mobile terminal 100 near the NFC reading surface 59 in a state in which the reference face 102 of the mobile terminal 100 is parallel to the NFC reading surface 59 of the NFC interface 52, the MFP 200 detects the mobile terminal 100 and establishes NFC communication with the mobile terminal 100.

There will be next explained the controller 60 of the MFP 200 in detail. As illustrated in FIG. 3A, the controller 60 includes: a CPU 61, a ROM 62, a RAM 63, and a flash memory 64 (as one example of a predefined-setting-value storage device). The ROM 62 stores various settings and firmware as control programs for controlling the MFP 200. The RAM 63 and the flash memory 64 are used as a working area from which the control programs are read or as a storage area for temporarily storing data. The RAM 63 includes: an attitude-signal storage area 63a for cumulatively storing attitude signals received from the mobile terminal 100; a setting-value storage area 63b for storing setting values or commands of a plurality of setting items for printing to be performed by the printing mechanism 51 (each hereinafter may be referred to as "print setting item"); and an image-data storage area 63c for storing image data transmitted from the mobile terminal 100. In the present embodiment, the print setting items include a printing-surface setting item and a printing-orientation setting item. The printing-surface setting item is a print setting item for determining which of duplex printing and simplex printing is to be used, and "DUPLEX PRINTING" and "SIMPLEX PRINTING" are provided as setting values for the printing-surface setting item. The printing-orientation setting item is a setting item for determining a printing orientation of an image with respect to a sheet, and "PORTRAIT PRINTING" and "LANDSCAPE PRINTING" are provided as setting values for the printing-orientation setting item.

The flash memory 64 stores the WFD connection information for establishing WFD communication between the MFP 200 and the mobile terminal 100. This WFD connection information includes: an SSID; a password; and information unique to the MFP 200 such as an IP address. The flash memory 64 further stores various applications for causing the MFP 200 to execute its function. These applications include: an NFC communication program 64a for performing NFC communication using the NFC interface 52; a wireless-LAN communication program 64b for performing WFD communication using the wireless LAN interface 53; a change-information creating program 64c; a setting-value setting program 64d; and a setting-value finalizing program 64e.

The change-information creating program 64c is designed to, each time when NFC communication is established between the MFP 200 and the mobile terminal 100, receive an attitude signal transmitted from the mobile terminal 100 and cumulatively store the attitude signal into the attitude-signal storage area 63a of the RAM 63. The change-information creating program 64c is also designed to use a plurality of attitude signals stored in the attitude-signal storage area 63a of the RAM 63 to create change information which represents a change of the attitude of the mobile terminal 100. In the present embodiment, the CPU 61 calculates a difference between an attitude signal received from the mobile terminal 100 when the (n+1)th NFC communication (n is an integer equal to or greater than one) is established and an attitude signal received from the mobile terminal 100 when the nth NFC communication is established and determines the obtained difference as the change information. This change information contains: lower-face change information created based on the lower face signal contained in the attitude signal; and orientation change information created based on the orientation signal contained in the attitude signal.

Figure 4A:
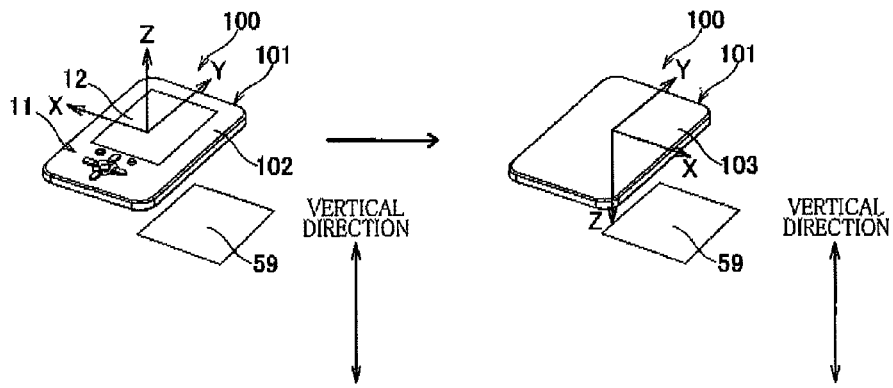
FIGS. 4A-4C are views each for explaining change information which represents an attitude of the mobile terminal illustrated in FIG. 1.
Figure 4B:
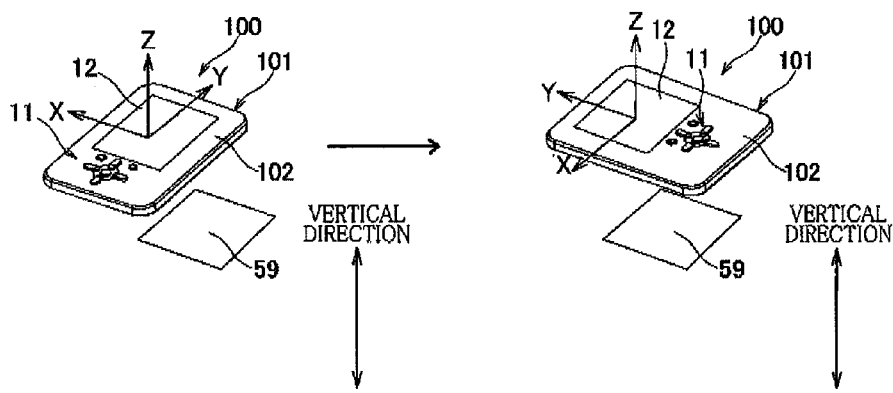
Figure 4C:
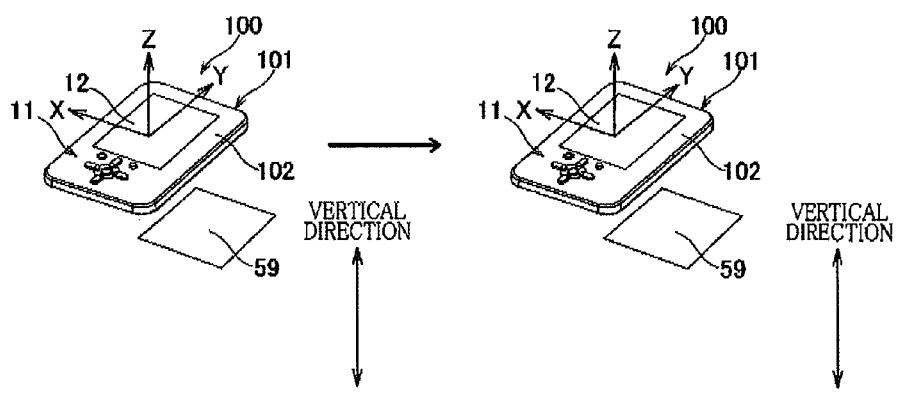

As described above, in the present embodiment, the NFC communication is established between the mobile terminal 100 and the MFP 200 when the user has brought the mobile terminal 100 near the NFC reading surface 59 in the state in which the reference face 102 of the mobile terminal 100 is parallel to the NFC reading surface 59 that is parallel to the horizontal plane. Thus, the lower face signal contained in the attitude signal received by the mobile terminal 100 indicates a positional relationship between the reference face 102 and the back face 103 in the vertical direction. Accordingly, one of "VERTICALLY INVERTED" and "NO CHANGES" is determined as the lower-face change information created based on the lower face signal. As illustrated in FIG. 4A, "VERTICALLY INVERTED" represents that the positional relationship between the reference face 102 and the back face 103 in the vertical direction is changed or inverted, and as illustrated in FIGS. 4B and 4C, "NO CHANGES" represents that there is no change in the positional relationship between the reference face 102 and the back face 103 in the vertical direction. Also, the orientation change information created based on the orientation signal of the attitude signal represents an angle (hereinafter referred to as "change angle θ") between the Y axis (the positive direction) when the nth NFC communication is established between the MFP 200 and the mobile terminal 100 and the Y axis (the positive direction) when the (n+1)th NFC communication is established between the MFP 200 and the mobile terminal 100 (see FIGS. 4A-4C).

The setting-value setting program 64d is designed to cause the mobile terminal 100 to set or change setting values for the print setting items, based on the change information created according to the change-information creating program 64c. Specifically, the setting-value setting program 64d includes predefined setting values for the printing-surface setting item and the printing-orientation setting item. In the present embodiment, the predefined setting value for the printing-surface setting item is "SIMPLEX PRINTING", and the predefined setting value for the printing-orientation setting item is "PORTRAIT PRINTING". At a point in time when the first NFC communication is established, the CPU 31 executing the setting-value setting program 64*d* stores the predefined print setting values into the setting-value storage area 63*b*. Here, the wordings "at the point in time when the first NFC communication is established" is a point in time when NFC communication is established between the mobile terminal 100 and the MFP 200 for the first time after image data to be printed is selected by the user.

The setting-value setting program 64*d* further includes a printing-surface change table. As illustrated in FIG. 3B, the printing-surface change table represents a relationship between the lower-face change information about the mobile terminal 100 and the setting value for the printing-surface setting item. The printing-surface change table represents that the setting value for the printing-surface setting item is not changed in the case where the lower-face change information is "NO CHANGES" and that the setting value for the printing-surface setting item is changed in the case where the lower-face change information is "VERTICALLY INVERTED" (i.e., "CHANGED"). Accordingly, the CPU 61 executing the setting-value setting program 64*d* changes the setting value for the printing-surface setting item stored in the setting-value storage area 63*b* only in a case where the lower-face change information of the change information created according to the change-information creating program 64*c* is "VERTICALLY INVERTED" (see FIG. 4A). For example, in a case where the setting value for the printing-surface setting item stored in the setting-value storage area 63*b* is "DUPLEX PRINTING", the CPU 61 changes the setting value for the printing-surface setting item to "SIMPLEX PRINTING", and in a case where the setting value for the printing-surface setting item stored in the setting-value storage area 63*b* is "SIMPLEX PRINTING", the CPU 61 changes the setting value for the printing-surface setting item to "DUPLEX PRINTING".

The setting-value setting program 64*d* further includes a printing-orientation change table. As illustrated in FIG. 3C, the printing-orientation change table represents a relationship between the orientation change information about the mobile terminal 100 and the setting value for the printing-orientation setting item. The printing-orientation change table represents that the setting value for the printing-orientation setting item is not changed in a case where the change angle $\theta$ represented by the orientation change information satisfies any of "$0° \leq \theta \leq 45°$" and "$135° \leq \theta \leq 180°$" and that the setting value for the printing-orientation setting item is changed in a case where the change angle $\theta$ represented by the orientation change information satisfies "$45° < \theta < 135°$". Accordingly, the CPU 61 executing the setting-value setting program 64*d* changes the setting value for the printing-orientation setting item stored in the setting-value storage area 63*b* only in the case where the change angle $\theta$ represented by the orientation change information of the change information created by the change-information creating program 64*c* satisfies "$45° < \theta < 135°$" (see FIG. 4B). For example, in a case where the setting value for the printing-orientation setting item stored in the setting-value storage area 63*b* is "PORTRAIT PRINTING", the CPU 61 changes the setting value for the printing-orientation setting item to "LANDSCAPE PRINTING", and in a case where the setting value for the printing-orientation setting item stored in the setting-value storage area 63*b* is "LANDSCAPE PRINTING", the CPU 61 changes the setting value for the printing-orientation setting item to "PORTRAIT PRINTING".

In the present embodiment, in a case where the lower-face change information of the change information created by the CPU 61 according to the change-information creating program 64*c* is "VERTICALLY INVERTED", and the change angle $\theta$ represented by the orientation change information is "$45° < \theta < 135°$", the setting values respectively for the printing-surface setting item and the printing-orientation setting item are changed at the same time. As a modification, priorities may be assigned to the respective print setting items, and in the above-described case, the CPU 61 may change only a setting value for the print setting item to which a higher priority is assigned.

As illustrated in FIG. 5, according to the setting-value setting program 64*d*, the CPU 61 controls the display 58 of the operation panel 54 to display an image 71 and a text image 72 which represent the setting values for the print setting items stored in the setting-value storage area 63*b*. The image 71 indicates a relationship between a sheet indicated by the solid line in FIG. 5 and an outline of a print area indicated by the broken line in FIG. 5 on which an image is to be printed on the sheet based on image data to be printed and indicates a relationship between an orientation of the sheet and an orientation of the image to be printed on the sheet. Also, the image 71 indicates a relationship between a face or faces of a sheet and an image or images to be printed on the face(s) of the sheet. The text image 72 is text information about the setting values for the print setting items stored in the setting-value storage area 63*b*. Each time when at least one of the setting values for the print setting items stored in the setting-value storage area 63*b* is changed, the CPU 61 executing the setting-value setting program 64*d* updates the image 71 and the text image 72 to be displayed on the display 58.

The setting-value finalizing program 64*e* is designed to finalize or fix the setting values for the print setting items stored in the setting-value storage area 63*b*. Specifically, according to the setting-value finalizing program 64*e*, the CPU 61 finalizes the setting values for the print setting items stored in the setting-value storage area 63*b* in a case where, after NFC communication established between the mobile terminal 100 and the MFP 200 is disconnected, NFC communication is not established again by the time when a predetermined length of time, e.g., 30 seconds, has passed from the disconnection.

The setting-value finalizing program 64*e* includes a setting-value finalizing table. As illustrated in FIG. 3D, the setting-value finalizing table represents the change information about the mobile terminal 100 which functions as a condition for finalizing the setting values for the print setting items stored in the setting-value storage area 63*b* (hereinafter referred to as "finalizing change information"). In the present embodiment, the finalizing change information is change information which indicates that the attitude of the mobile terminal 100 is not changed by equal to or greater than a predetermined threshold value between a point in time when the (n+1)th NFC communication is established and a point in time when the nth NFC communication is established. Specifically, as illustrated in FIG. 3D, in a case where the lower-face change information of the change information about the mobile terminal 100 is "NO CHANGES", and the change angle $\theta$ represented by the orientation change information is "$0° \leq \theta \leq 45°$", the setting-value finalizing table represents the CPU 61 finalizes the setting values for the print setting items stored in the setting-value storage area 63*b*. Accordingly, when the change information is created according to the change-information creating program 64*c*, the CPU 61 according to the setting-value finalizing program 64*e* finalizes the setting values for the print setting items stored in the setting-value storage area 63*b* in a case where the change information is the finalizing change information (see FIG. 4C). As a result, the user can easily and reliably finalize the desired setting values using the attitude of the mobile terminal 100 which is taken when the NFC communication is established.

After the CPU 61 finalizes the setting values for the print setting items which are stored in the setting-value storage area 63*b* according to the setting-value finalizing program 64*e*, the CPU 61 uses the setting values for the print setting items to control the printing mechanism 51 to print an image on a sheet.

The CPU 61 executes various processings while storing results of calculations into the RAM 63 or the flash memory 64 according to the control programs read from the ROM 62 and the programs read from the flash memory 64. The CPU 61 also controls the applications stored in the flash memory 64.

Figure 6:
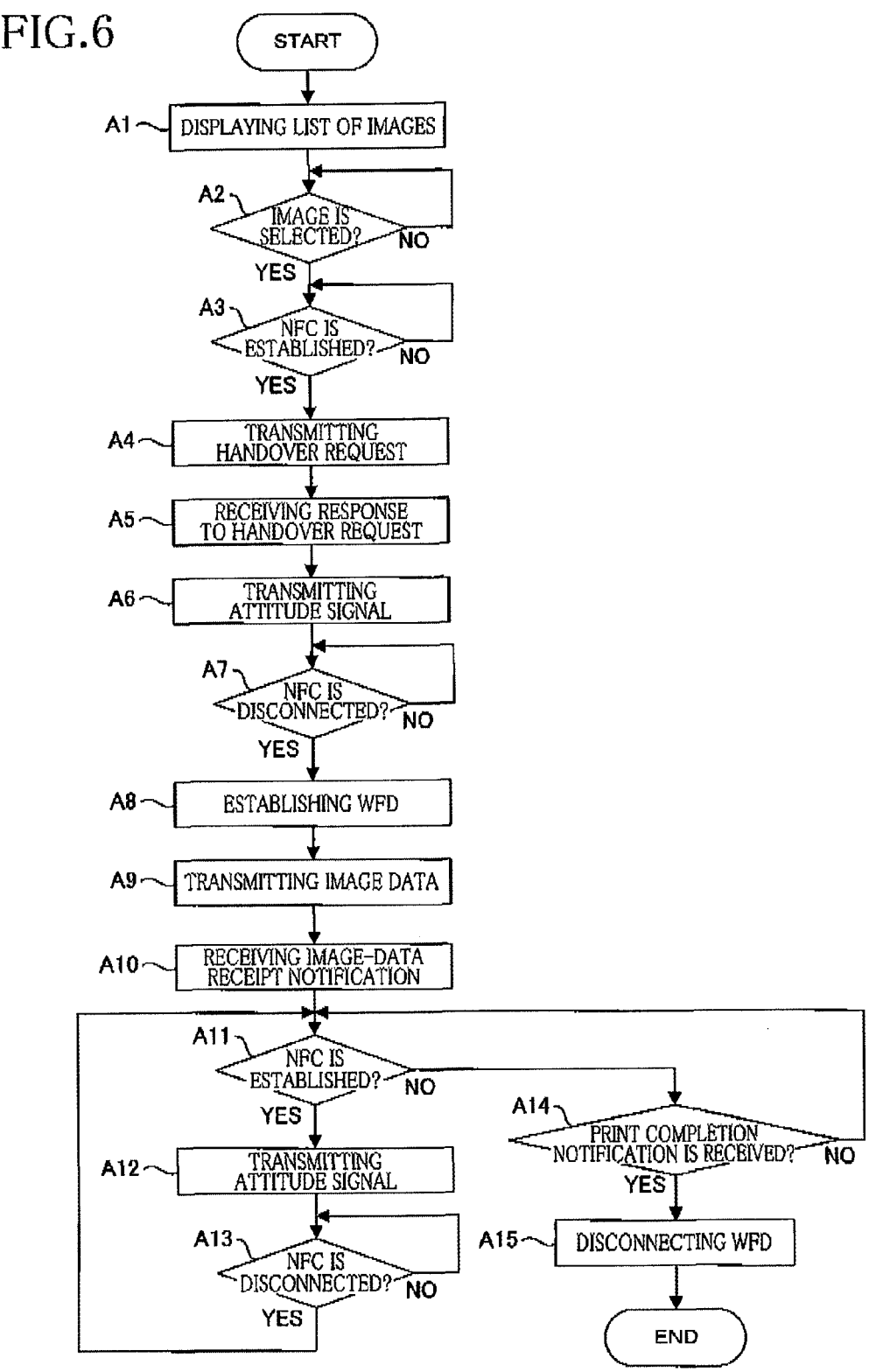
FIG. 6 is a flow chart illustrating an operation flow of the mobile terminal illustrated in FIG. 1.

Overview of Image-Data Transmission Program and Attitude-Signal Obtaining Program There will be next explained, with reference to FIG. 6, processings to be executed by the CPU 31 of the mobile terminal 100 according to the image-data transmission program 34*c* and the attitude-signal obtaining program 34*d* installed on the mobile terminal 100.

The flow in FIG. 6 begins with A1 at which the CPU 31 controls the touch panel 12 to display, as an initial screen, a list of images based on image data stored in the memory card 17*a*, by file names or thumbnail images. When the user has then selected image data to be printed from the list of the images based on the image data, the CPU 31 receives an electric signal corresponding to the image data from the touch panel 12 (A2: YES). After the selection of the image data to be printed, when the user has brought the mobile terminal 100 into close proximity to the NFC reading surface 59 of the MFP 200, the MFP 200 detects the mobile terminal 100 and establishes NFC communication between the mobile terminal 100 and the MFP 200. The CPU 31 at A3 determines whether the NFC communication has been established or not. When the NFC communication is not established (A3: NO), the CPU 31 controls the touch panel 12 to display an image for prompting the user to bring the mobile terminal 100 near the NFC reading surface 59 of the MFP 200 and waits for the NFC communication to be established.

When the NFC communication is established (A3: YES), the CPU 31 at A4 transmits a handover request to the MFP 200 over the NFC communication. This handover request includes: a command indicating a request of a handover to the WFD communication; and the WFD connection information stored in the flash memory 34. The CPU 31 at A5 receives a response to the handover request from the MFP 200 over the NFC communication. This response to the handover request includes the WFD connection information stored in the flash memory 64 of the MFP 200. Thus, using the WFD connection information enables WFD communication to be established between the mobile terminal 100 and the MFP 200.

The CPU 31 at A6 obtains the attitude signal being output from the sensor 20 and transmits the obtained attitude signal to the MFP 200 over the NFC communication. When the user has thereafter moved the mobile terminal 100 away from the NFC reading surface 59 of the MFP 200, and a distance between the mobile terminal 100 and the NFC reading surface 59 becomes greater than the communicable distance of the NFC communication, the NFC communication between the mobile terminal 100 and the MFP 200 is disconnected. The CPU 31 at A7 determines whether the NFC communication has been disconnected or not. When the NFC communication is not disconnected (A7: NO), the CPU 31 controls the touch panel 12 to display an image for prompting the user to move the mobile terminal 100 away from the NFC reading surface 59 of the MFP 200 and waits for the NFC communication to be disconnected.

When the NFC communication is disconnected (A7: YES), the CPU 31 at A8 establishes WFD communication with the MFP 200 using the WFD connection information contained in the response to the handover request which is received at A5. That is, a handover from the NFC communication to the WFD communication has been performed. Upon the establishment of the WFD communication between the mobile terminal 100 and the MFP 200, the CPU 31 at A9 uses the WFD communication to send the MFP 200 image data to be printed which is selected by the user. Thereafter, the CPU 31 at A10 receives a notification about receipt of the image data (hereinafter may be referred to as "image-data receipt notification") from the MFP 200. The image-data receipt notification is a notification which is transmitted from the MFP 200 to the mobile terminal 100 over the WFD communication when the MFP 200 has received the image data transmitted from the mobile terminal 100.

The CPU 31 at A11 determines whether the NFC communication has been established again between the mobile terminal 100 and the MFP 200 or not. When the NFC communication is established again (A11: YES), the CPU 31 at A12 obtains the attitude signal being output from the sensor 20 and transmits the obtained attitude signal to the MFP 200 over the NFC communication. Then, the CPU 31 at A13 determines whether the NFC communication has been disconnected or not. When the NFC communication is not disconnected (A13: NO), the CPU 31 waits for the NFC communication to be disconnected. On the other hand, when the NFC communication is disconnected (A13: YES), this flow returns to A11.

When the CPU 31 at A11 determines that the NFC communication is not established again between the mobile terminal 100 and the MFP 200 (A11: NO), the CPU 31 at A14 determines whether the CPU 31 has received a print completion notification from the MFP 200 or not. The print completion notification is a notification which is transmitted from the MFP 200 to the mobile terminal 100 over the WFD communication when the MFP 200 has completed printing of an image based on the image data received from the mobile terminal 100. When the print completion notification is not received (A14: NO), this flow goes to A11. On the other hand, when the print completion notification is received (A14: YES), the CPU 31 at A15 disconnects the WFD communication between the mobile terminal 100 and the MFP 200, and this flow in FIG. 6 ends.

Figure 7:
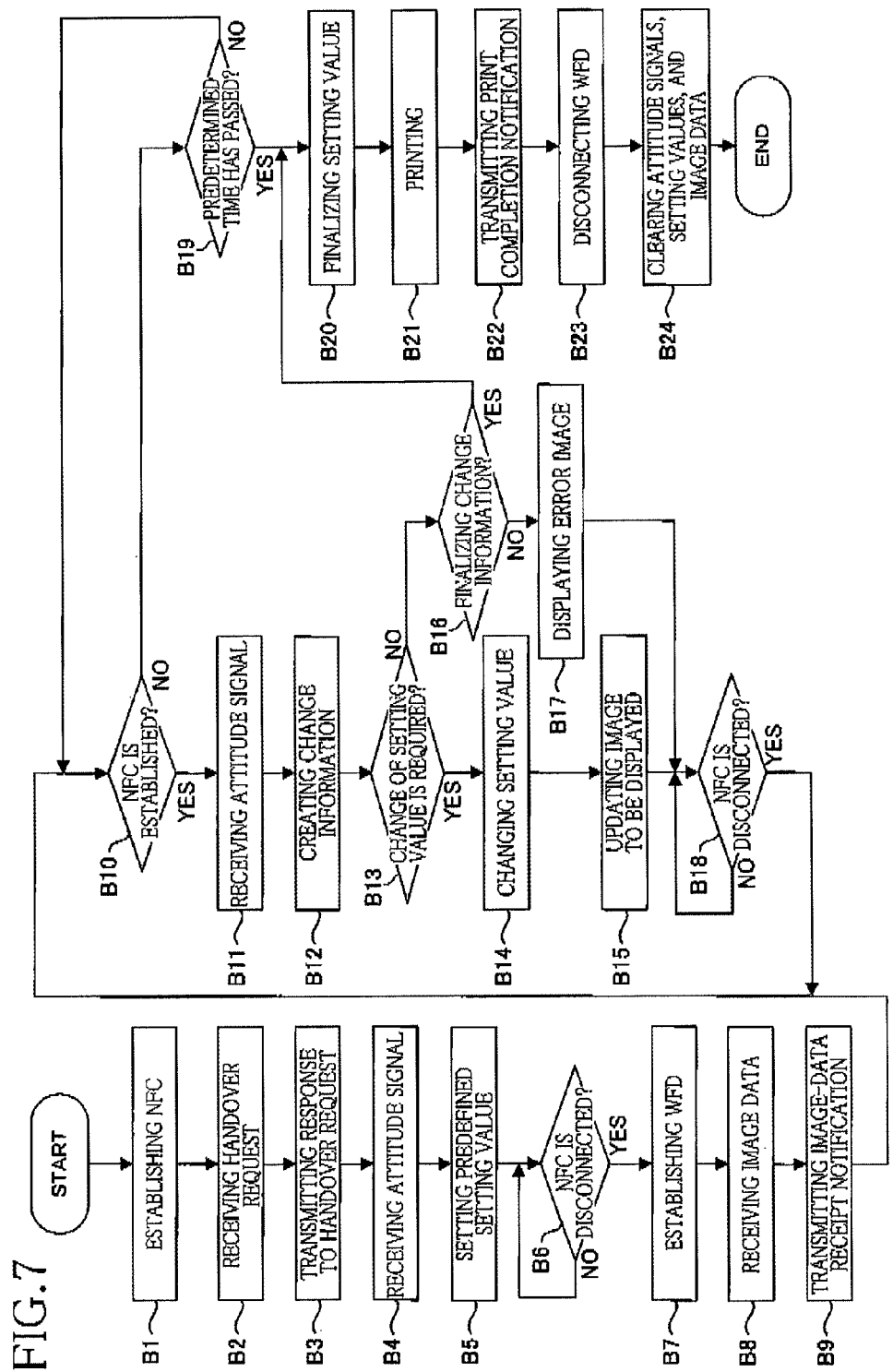
FIG. 7 is a flow chart illustrating an operation flow of the MFP illustrated in FIG. 1.

Overview of Change-Information Creating Program, Setting-Value Setting Program, and Setting-Value Finalizing Program There will be next explained, with reference to FIG. 7, processings to be executed by the CPU 61 of the MFP 200 according to the change-information creating program 64*c*, the setting-value setting program 64*d*, and the setting-value finalizing program 64*e* installed on the MFP 200. It is assumed that the image data to be printed has been selected by the user at the start of the flow in FIG. 7 in the mobile terminal 100 which is to be brought closer to the NFC reading surface 59 of the MFP 200.

When the NFC communication is established between the mobile terminal 100 and the MFP 200 at B1, the CPU 61 at B2 receives the handover request from the mobile terminal 100 over the NFC communication. The CPU 61 at B3 uses the NFC communication to send the mobile terminal 100 the response to the handover request which contains the WFD connection information stored in the flash memory 64. The CPU 61 at B4 receives the attitude signal from the mobile terminal 100 over the NFC communication and stores the received attitude signal into the attitude-signal storage area 63a of the RAM 63. The CPU 61 at B5 stores the predefined setting values for the print setting items stored in the flash memory 64, into the setting-value storage area 63b of the RAM 63 and controls the display 58 of the operation panel 54 to display the image 71 and the text image 72 representative of the predefined setting values for the print setting items.

The CPU 61 at B6 determines whether the NFC communication between the mobile terminal 100 and the MFP 200 has been disconnected or not. When the NFC communication is not disconnected (B6: NO), the CPU 61 waits for the NFC communication to be disconnected. When the NFC communication is disconnected (B6: YES), the CPU 61 at B7 establishes WFD communication between the MFP 200 and the mobile terminal 100. The CPU 61 at B8 uses the WFD communication to receive the image data transmitted from the mobile terminal 100 and stores the received image data into the image-data storage area 63c of the RAM 63. The CPU 61 at B9 transmits the image-data receipt notification to the mobile terminal 100 over the WFD communication.

The CPU 61 at B10 determines whether the NFC communication has been established again between the mobile terminal 100 and the MFP 200 or not. When the NFC communication is established again (B10: YES), the CPU 61 at B11 receives the attitude signal from the mobile terminal 100 over the NFC communication and cumulatively stores the received attitude signal into the attitude-signal storage area 63a of the RAM 63. The CPU 61 at B12 refers to the attitude-signal storage area 63a to create change information based on the attitude signal received when the current NFC communication is established and the attitude signal received when the preceding NFC communication is established.

The CPU 61 at B13 refers to the printing-surface change table and the printing-orientation change table stored in the flash memory 64 to determine whether or not the created change information is change information which requires a change of at least one of the setting values for the print setting items stored in the setting-value storage area 63b. When the created change information is change information required for a change of at least one of the setting values (B13: YES), the CPU 61 at B14 changes the setting value(s) for the print setting items stored in the setting-value storage area 63b based on the change information and at B15 updates the image 71 and the text image 72 to be displayed on the display 58 of the operation panel 54, and this flow goes to B18.

On the other hand, the created change information is change information not required for a change of any of the setting values (B13: NO), the CPU 61 at B16 refers to the setting-value finalizing table stored in the flash memory 64 to determine whether the created change information is the finalizing change information or not. When the created change information is not the finalizing change information (B16: NO), the CPU 61 at B17 controls the display 58 to display an error image indicating that the change information is neither the finalizing change information nor the change information required for a change of at least one of the setting values, and this flow goes to B18. On the other hand, when the created change information is the finalizing change information (B16: YES), this flow goes to B20.

At B18, the CPU 61 determines whether the NFC communication between the mobile terminal 100 and the MFP 200 has been disconnected or not. When the NFC communication is not disconnected (B18: NO), the CPU 61 waits for the NFC communication to be disconnected. On the other hand, when the NFC communication is disconnected (B18: YES), the flow returns to B10.

When the CPU 61 at B10 determines that the NFC communication is not established again between the mobile terminal 100 and the MFP 200 (B10: NO), the CPU 61 at B19 determines whether or not the predetermined length of time as one example of a first period has passed from disconnection of the latest NFC communication. When the predetermined length of time has not passed (B19: NO), this flow goes to B10. On the other hand, when the predetermined length of time has passed (B19: YES), this flow goes to B20.

The CPU 61 at B20 finalizes the setting values for the print setting items stored in the setting-value storage area 63b of the RAM 63. The CPU 61 at B21 controls the printing mechanism 51 to print an image on a sheet based on the image data stored in the image-data storage area 63c and based on the setting values for the print setting items stored in the setting-value storage area 63b. Upon completion of the printing, the CPU 61 at B22 transmits the print completion notification to the mobile terminal 100 over the WFD communication and at B23 disconnects the WFD communication between the mobile terminal 100 and the MFP 200. The CPU 61 at B24 deletes the attitude signals stored in the attitude-signal storage area 63a of the RAM 63, the setting values stored in the setting-value storage area 63b, and the image data stored in the image-data storage area 63c, and this flow in FIG. 7 ends.

Procedure of Data Communication Between Devices

Figure 8:
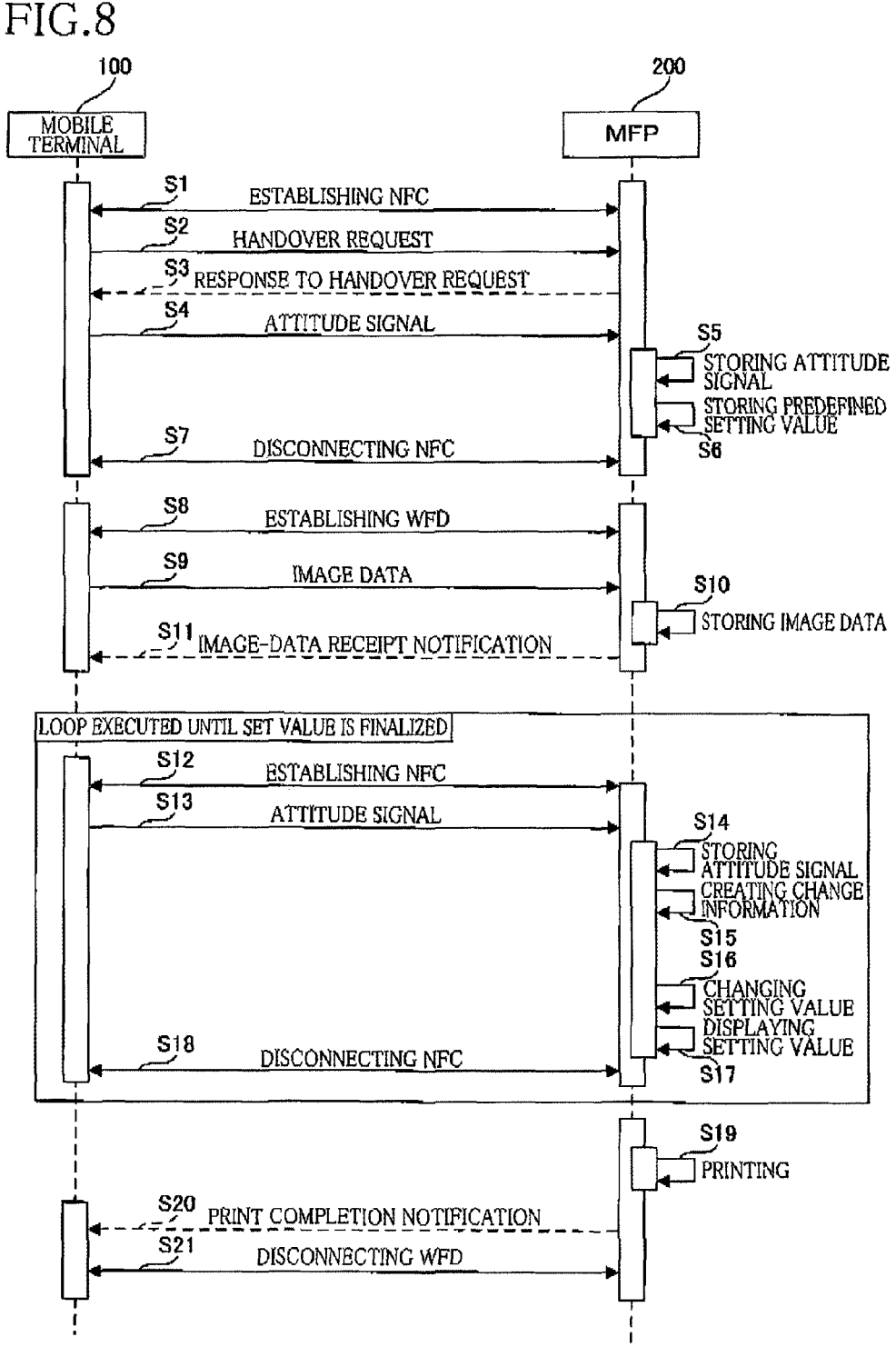
FIG. 8 is a sequence diagram illustrating a procedure of data communication between the mobile terminal and the MFP.

There will be next explained, with reference to FIG. 8, a procedure of data communication between the mobile terminal 100 and the MFP 200. As illustrated in FIG. 8, when the user has brought the mobile terminal 100 near the NFC reading surface 59 of the MFP 200, the NFC communication is established at S1. The mobile terminal 100 at S2 transmits the handover request to the MFP 200 over the NFC communication. Having received the handover request, the MFP 200 at S3 transmits the response to the handover request to the mobile terminal 100 over the NFC communication. As a result, the WFD connection information is transferred between the mobile terminal 100 and the MFP 200, so that the WFD communication can be established.

At S4, the mobile terminal 100 obtains the attitude signal being output from the sensor 20 and transmits the obtained attitude signal to the MFP 200 over the NFC communication. Having received the attitude signal, the MFP 200 at S5 stores the attitude signal into the attitude-signal storage area 63a of the RAM 63. The MFP 200 at S6 stores the predefined setting values for the print setting items stored in the flash memory 64, into the setting-value storage area 63b of the RAM 63 and controls the display 58 of the operation panel 54 to display the image 71 and the text image 72 representative of the predefined setting values.

When the user has thereafter moved the mobile terminal 100 away from the NFC reading surface 59 of the MFP 200, the NFC communication is disconnected at S7. At S8, the WFD communication is established between the mobile terminal 100 and the MFP 200 based on the WFD connection information transferred over the NFC communication. The mobile terminal 100 at S9 transmits image data to be printed, to the MFP 200 over the WFD communication. The MFP 200 at S10 stores the received image data into the image-data storage area 63c of the RAM 63 and at S11 transmits the image-data receipt notification to the mobile terminal 100 over the WFD communication.

When the user has brought the mobile terminal 100 near the NFC reading surface 59 of the MFP 200 again, the NFC communication is established again at S12. The mobile terminal 100 at S13 obtains the attitude signal being output from the sensor 20 and transmits the obtained attitude signal to the MFP 200 over the NFC communication. Having received the attitude signal, the MFP 200 at S14 stores the attitude signal into the attitude-signal storage area 63a of the RAM 63 without overwriting the existing attitude signals, that is, the MFP 200 cumulatively stores the attitude signals.

The MFP 200 at S15 creates the change information based on the attitude signal received when the current NFC communication is established and the attitude signal received when the preceding NFC communication is established among the attitude signals stored in the attitude-signal storage area 63a. The MFP 200 at S16 changes, based on the created change information, the setting values for the print setting items stored in the setting-value storage area 63b of the RAM 63 and at S17 updates the image 71 and the text image 72 to be displayed on the display 58 of the operation panel 54. When the user has thereafter moved the mobile terminal 100 away from the NFC reading surface 59 of the MFP 200, the NFC communication is disconnected at 518. The processings at 512-518 are repeated until the MFP 200 finalizes the setting values for the print setting items stored in the setting-value storage area 63b of the RAM 63.

When the setting values for the print setting items stored in the setting-value storage area 63b are finalized by the MFP 200, the MFP 200 at S19 uses the setting values for the print setting items stored in the setting-value storage area 63b to print an image on a sheet based on the image data stored in the image-data storage area 63c. Upon completion of the printing, the MFP 200 at S20 uses the WFD communication to transmit a print completion notification to the mobile terminal 100. At 521, the WFD communication between the mobile terminal 100 and the MFP 200 is disconnected.

In the present embodiment, the user can set the setting values for the print setting items of the MFP 200 by changing the attitude of the mobile terminal 100 when the NFC communication is established. Accordingly, the user can more easily set the setting values for the print setting items. Also, the change information is created based on the attitude of the mobile terminal 100 upon establishments of two continuous NFC communications, and the setting values for the print setting items are set based on the created change information, resulting in improvement in operability of the user. Also, the flash memory 64 stores the predefined setting values for the print setting items, and when NFC communication is not established again after the first NFC communication (i.e., the NFC communication established for the first time) is disconnected, the MFP 200 prints an image based on the predefined setting values. Accordingly, printing based on the predefined setting values can be easily performed by establishment of one NFC communication.

Second Embodiment

There will be next explained a second embodiment of the present invention. This second embodiment differs from the first embodiment in that the mobile terminal 100 creates the change information instead of the MFP 200. In the following explanation, only processings different from those in the above-described embodiment will be explained. While the change-information creating program 64c is stored in the flash memory 64 of the MFP 200 in the first embodiment, the change-information creating program 64c is stored in the flash memory 34 of the mobile terminal 100 in this second embodiment. Also, the CPU 31 of the mobile terminal 100 executes the change-information creating program 64c. The CPU 31 which executes the change-information creating program 64c also transmits the created change information from the mobile terminal 100 to the MFP 200. The CPU 31 which executes the attitude-signal obtaining program 34d stored in the flash memory 34 of the mobile terminal 100 only obtains the attitude signal being output from the sensor 20 and does not transmit the attitude signal to the MFP 200.

Figure 9:
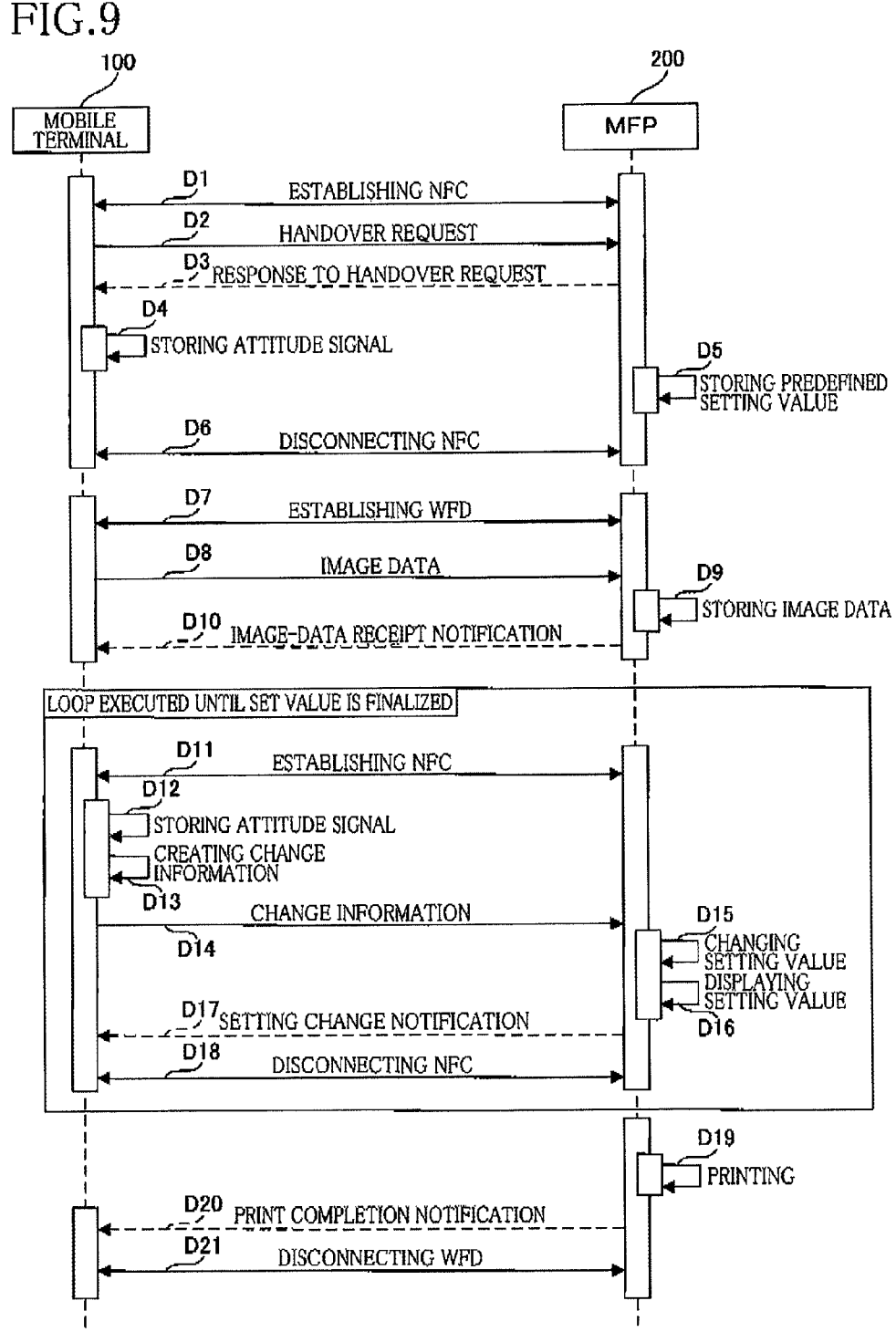
FIG. 9 is a sequence diagram illustrating a procedure of data communication between a mobile terminal and an MFP according to a second embodiment.

There will be next explained, with reference to FIG. 9, a procedure of data communication between the mobile terminal 100 and the MFP 200 in the present embodiment. Initially, processings D1-D3 similar to the above-described processings S1-S3 are executed between the mobile terminal 100 and the MFP 200. The mobile terminal 100 at D4 obtains the attitude signal being output from the sensor 20 and stores the obtained attitude signal into the RAM 33 of the mobile terminal 100. Thereafter, processings at D5-D10 similar to the above-described processings at S6-S11 are executed.

After the processing at D10, when the user has brought the mobile terminal 100 near the NFC reading surface 59 of the MFP 200 again, the NFC communication is established again at D11. The mobile terminal 100 obtains the attitude signal being output from the sensor 20 and cumulatively stores the obtained attitude signal into the RAM 33 at D12. The mobile terminal 100 at D13 creates the change information based on the attitude signal received when the current NFC communication is established and the attitude signal received when the preceding NFC communication is established among the attitude signals stored in the RAM 33. The mobile terminal 100 at D14 transmits the created change information to the MFP 200 over the NFC communication.

Having received the change information, the MFP 200 at D15 changes, based on the change information, at least one of the setting values for the print setting items stored in the setting-value storage area 63b of the RAM 63 and at D16 updates the image 71 and the text image 72 to be displayed on the display 58. The MFP 200 at D17 transmits a setting change notification to the mobile terminal 100 over the NFC communication. This setting change notification indicates that the MFP 200 has finished changing the setting value(s) for the print setting items. When the user has thereafter moved the mobile terminal 100 away from the NFC reading surface 59 of the MFP 200, the NFC communication is disconnected at D18. The processings at D11-D18 are repeated until the MFP 200 finalizes the setting values for the print setting items stored in the setting-value storage area 63b of the RAM 63. When the setting values for the print setting items stored in the setting-value storage area 63b are finalized by the MFP 200, processings at D19-D21 similar to the above-described processings at S19-S21 are executed.

Also in the second embodiment as described above, the user can set the setting values for the print setting items of the MFP 200 by changing the attitude of the mobile terminal 100 upon establishment of the NFC communication.

Third Embodiment

There will be next explained a third embodiment of the present invention. In this third embodiment, the mobile terminal 100 creates the change information about the mobile terminal 100 as in the second embodiment. Furthermore, in the third embodiment, the mobile terminal 100 also sets the setting values for the print setting items of the MFP 200 based on the created change information and finalizes the setting values for the print setting items. In the following explanation, only processings different from those in the above-described embodiments will be explained. While the change-information creating program 64c, the setting-value setting program 64d, and the setting-value finalizing program 64e are stored in the flash memory 64 of the MFP 200 in the first embodiment, these programs are stored in the flash memory 34 of the mobile terminal 100 in this third embodiment. The CPU 31 of the mobile terminal 100 executes these programs. After the setting values for the print setting items of the MFP 200 are finalized, the CPU 31 which executes the image-data transmission program 34c transmits the image data to be printed and the finalized setting values for the print setting items, from the mobile terminal 100 to the MFP 200.

Figure 10:
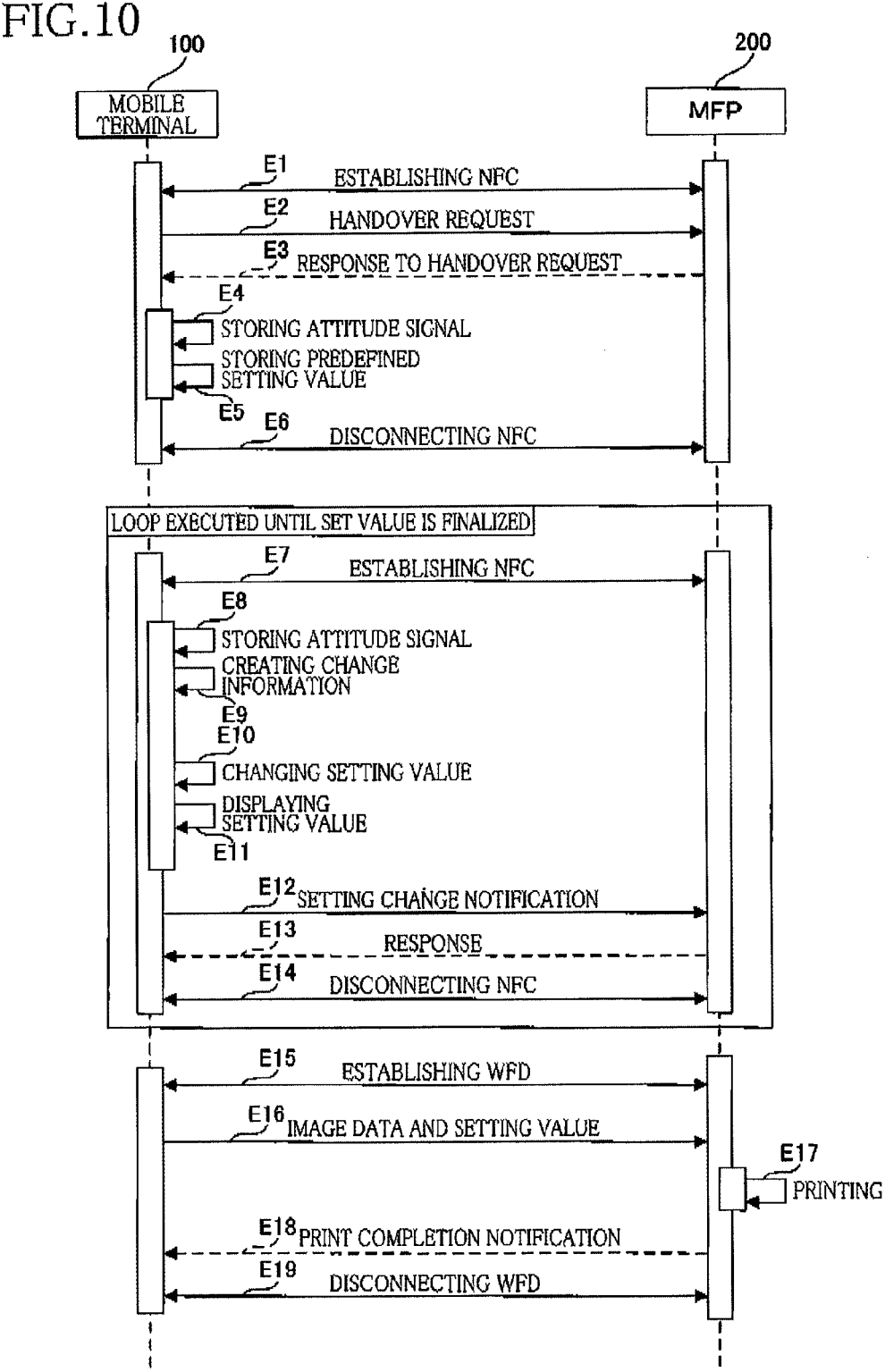
FIG. 10 is a sequence diagram illustrating a procedure of data communication between a mobile terminal and an MFP according to a third embodiment.

There will be next explained, with reference to FIG. 10, a procedure of data communication between the mobile terminal 100 and the MFP 200 in the present embodiment. Initially, processings E1-E3 similar to the above-described processings S1-S3 are executed. The mobile terminal 100 at E4 obtains the attitude signal being output from the sensor 20 and stores the obtained attitude signal into the RAM 33 of the mobile terminal 100. The mobile terminal 100 at E5 stores, into the RAM 33, the predefined setting values for the print setting items stored in the flash memory 34 and controls the touch panel 12 of the mobile terminal 100 to display the image 71 and the text image 72 representative of the predefined setting values. When the user has thereafter moved the mobile terminal 100 away from the NFC reading surface 59 of the MFP 200, the NFC communication is disconnected at E6.

When the user has thereafter brought the mobile terminal 100 near the NFC reading surface 59 of the MFP 200 again, the NFC communication is established again at E7. The mobile terminal 100 at E8 obtains the attitude signal being output from the sensor 20 and cumulatively stores the obtained attitude signal into the RAM 33. The mobile terminal 100 at E9 refers to the RAM 33 to create the change information based on the attitude signal received when the current NFC communication is established and the attitude signal received when the preceding NFC communication is established. The mobile terminal 100 at E10 changes, based on the change information, the setting values for the print setting items stored in the RAM 33 and at E11 updates the image 71 and the text image 72 to be displayed on the touch panel 12. The mobile terminal 100 at E12 transmits the setting change notification to the MFP 200 over the NFC communication. The MFP 200 at E13 transmits a response to the setting change notification, to the mobile terminal 100 over the NFC communication. When the user has thereafter moved the mobile terminal 100 away from the NFC reading surface 59 of the MFP 200, the NFC communication is disconnected at D14. These processings at E7-E14 are repeated until the mobile terminal 100 finalizes the setting values for the print setting items stored in the RAM 33.

When the mobile terminal 100 has finalized the setting values for the print setting items stored in the RAM 33, the WFD communication is established at E15 between the mobile terminal 100 and the MFP 200 based on the WFD connection information transferred over the NFC communication. The mobile terminal 100 at E16 transmits the finalized setting values for the print setting items and the image data to be printed to the MFP 200 over the WFD communication. The MFP 200 at E 17 prints an image on a sheet based on the image data received from the mobile terminal 100 and based on the setting values for the print setting items received from the mobile terminal 100. Then, processings E18 and E19 similar to the above-described processings at S20 and S21 are executed.

Also in the third embodiment as described above, the user can set the setting values for the print setting items of the MFP 200 by changing the attitude of the mobile terminal 100 upon establishment of the NFC communication.

While the embodiments of the present invention have been described above, it is to be understood that the invention is not limited to the details of the illustrated embodiments, but may be embodied with various changes and modifications, which may occur to those skilled in the art, without departing from the spirit and scope of the invention. For example, in the above-described embodiments, the NFC communication and the WFD communication are respectively employed as the first wireless communication and the second wireless communication, and the handover from the NFC communication to the WFD communication is performed, but the present invention is not limited to this configuration. That is, any two communication standards may be employed as long as these two communication standards have different communication distances. For example, the second wireless communication may be a non-direct Wi-Fi (R) according to which communication is performed via an access point. Alternatively, the second wireless communication may be the Bluetooth (R).

In the above-described embodiments, the printing-surface setting item and the printing-orientation setting item are used as the print setting items for which setting value are set based on the change information, but the present invention is not limited to this configuration. For example, a print setting item whose set values are "COLOR PRINTING" and "BLACK/WHITE PRINTING" may be provided, and the setting value for the print setting item may be changed based on the change information. In the above-described embodiments, the change information is created based on the attitude signal obtained from the sensor when the (n+1)th NFC communication is established and the attitude signal obtained from the sensor when the nth NFC communication is established. However, the present invention is not limited to this processing as long as the change information is created based on a plurality of attitude signals. For example, the change information may be created based on an attitude signal obtained from the sensor when the third or subsequent NFC communication is established and an attitude signal obtained from the sensor when the first NFC communication is established.

While the NFC reading surface 59 of the MFP 200 is parallel to the horizontal plane in the above-described embodiments, the NFC reading surface 59 may have a different construction. For example, the NFC reading surface 59 may be parallel to the vertical plane. In this construction, the gravity sensor 21 only needs to output, as a signal corresponding to the orientation signal, a signal corresponding to a signal indicative of an angle, with respect to the vertical direction, of a vector obtained by projecting the positive direction of the Y axis of the mobile terminal 100 onto the vertical plane. Also, the orientation sensor 22 only needs to output, as a signal corresponding to the lower face signal, a signal indicative of a positional relationship of the reference face 102 and the back face 103 of the mobile terminal 100 with respect to the NFC reading surface 59 based on an angle, with respect to the true north, of a vector obtained by projecting the positive direction of the Z axis of the mobile terminal 100 onto the horizontal plane. The sensor is not limited to that in the above-described embodiments, and any sensor may be used as long as the sensor outputs a signal relating to the attitude of the mobile terminal 100. The image recording apparatus is not limited to the MFP, and any device may be employed as the image recording apparatus as long as the device has the printing function.

Also, the setting values for the print setting items may be set without using the predefined setting values for the print setting items. This configuration requires at least two NFC communications for setting the setting values for the print setting items. Thus, when the change information is the finalizing change information, the setting values for the print setting items are finalized after the third or subsequent NFC communication.

In the above-described embodiments, when the first NFC communication is established, the mobile terminal 100 and the MFP 200 transfer the WFD connection information about the mobile terminal 100 and the MFP 200 to each other, but the WFD connection information may be transmitted in only one direction from one device to another device. For example, when the first NFC communication is established, only the WFD connection information about the mobile terminal 100 may be transmitted from the mobile terminal 100 to the MFP 200 over the NFC communication. In this configuration, the information unique to the MFP 200 which is required for the mobile terminal 100 to identify the MFP 200 may be transmitted from the MFP 200 to the mobile terminal 100 over the WFD communication. Also, the processings in the above-described embodiments may be executed by a single CPU, a plurality of CPUs, hardware such as ASIC, or a combination thereof. Also, the CPU may execute some of the processings according to the OS. Also, the processings in the embodiment may be executed by various forms such as instructions stored in a non-transitory recording medium and a method for executing the processings. Also, the image data and the WFD connection information about the mobile terminal may be stored in the same memory of the mobile terminal.

What is claimed is:

1. An image recording system comprising:
   a mobile terminal; and
   an image recording apparatus configured to record an image on a recording medium,
   the mobile terminal comprising:
     a storage device configured to store image data;
     a mobile-terminal first communication device configured to perform data communication with the image recording apparatus over first wireless communication which is established when a distance between the mobile terminal and the image recording apparatus is equal to or less than a communicable distance;
     a mobile-terminal second communication device configured to perform data communication with the image recording apparatus over second wireless communication which is established based on communication setting information about the mobile terminal and the image recording apparatus;
     a position detector configured to output a signal representative of a position of the mobile terminal; and
     a mobile-terminal controller,
   the mobile-terminal controller being configured to:
     perform at least one of transmitting the communication setting information about the mobile terminal over the first wireless communication and receiving the communication setting information about the image recording apparatus over the first wireless communication; and
     transmit the image data stored in the storage device to the image recording apparatus over the second wireless communication,
   the image recording apparatus comprising:
     a recording device configured to record an image on the recording medium based on the image data;
     an image-recording-apparatus first communication device configured to perform data communication with the mobile terminal over the first wireless communication;
     an image-recording-apparatus second communication device configured to perform data communication with the mobile terminal over the second wireless communication; and
     an image-recording-apparatus controller,
   the image-recording-apparatus controller being configured to perform at least one of receiving, over the first wireless communication, the communication setting information about the mobile terminal which is transmitted by the control of the mobile-terminal controller and transmitting, over the first wireless communication, the communication setting information about the image recording apparatus which is to be received by the control of the mobile-terminal controller,
   the mobile-terminal controller being configured to, each time when the first wireless communication is established, obtain the signal relating to the position of the mobile terminal which is output from the position detector,
   one of the mobile-terminal controller and the image-recording-apparatus controller being configured to:
     create change information representative of a change of the position of the mobile terminal, based on a plurality of the signals obtained by the mobile-terminal controller; and
     based on the created change information, set at least one setting value respectively for at least one setting item relating to the image recording of the image recording apparatus,
   the image-recording-apparatus controller being configured to control the recording device to record an image on the recording medium based on the image data received over the second wireless communication and based on the set at least one setting value respectively for the at least one setting item.

2. The image recording system according to claim 1, wherein one of the mobile-terminal controller and the image-recording-apparatus controller is configured to set the at least one setting value respectively for the at least one setting item based on the change information created based on (i) the signal relating to the position of the mobile terminal which is obtained from the position detector by the mobile-terminal controller when the first wireless communication is established for an (n+1)th time and (ii) the signal obtained by the mobile-terminal controller when the first wireless communication is established for an nth time, wherein n is an integer equal to or greater than one.

3. The image recording system according to claim 1,
   wherein one of the mobile-terminal controller and the image-recording-apparatus controller is configured to create the change information based on (i) the signal obtained by the mobile-terminal controller when the first wireless communication is established for a second or subsequent time and (ii) the signal obtained by the mobile-terminal controller when the first wireless communication is established before the first wireless communication is established for the second or subsequent time, and
   wherein the one of the mobile-terminal controller and the image-recording-apparatus controller is configured to, based on the created change information, set a plurality of set values respectively for a plurality of setting items as the at least one setting item relating to the image recording.

4. The image recording system according to claim 1,
   wherein one of the mobile-terminal controller and the image-recording-apparatus controller further comprises a predefined-setting-value storage device configured to store a predefined setting value which is set in advance for the at least one setting item, and wherein the image-recording-apparatus controller is configured to control the recording device to record the image on the recording medium based on the image data received over the second wireless communication and based on the predefined setting value stored in the predefined-setting-value storage device, when first wireless communication is not established again throughout a first period extending from disconnection of initial first wireless communication which is established for a first time.

5. The image recording system according to claim 1, wherein one of the mobile-terminal controller and the image-recording-apparatus controller is configured to control the recording device to record the image on the recording medium based on the image data received over the second wireless communication and based on the at least one setting value having already set respectively for the at least one setting item, when the change information created based on (i) the signal obtained by the mobile-terminal controller when the first wireless communication is established for an mth time and (ii) the signal obtained by the mobile-terminal controller when the first wireless communication is established before the first wireless communication is established for the mth time does not represent a change by equal to or greater than a first value, wherein m is an integer equal to or greater than two.

6. The image recording system according to claim 1,
wherein the mobile-terminal controller is configured to transmit the signal obtained when the first wireless communication is established, to the image recording apparatus over the first wireless communication, and wherein the image-recording-apparatus controller is configured to:
receive the signal each time when the first wireless communication is established;
create the change information based on the plurality of received signals;
based on the created change information, set the at least one setting value respectively for the at least one setting item; and
control the recording device to record the image on the recording medium based on the image data received over the second wireless communication and based on the set at least one setting value.

7. An image recording apparatus comprising:
a recording device configured to record an image on a recording medium based on image data;
a first communication device configured to perform data communication with a mobile terminal over first wireless communication which is established when a distance between a transmitter device and a receiver device is equal to or less than a communicable distance;
a second communication device configured to perform data communication with the mobile terminal over second wireless communication which is established based on communication setting information about a transmitter device and a receiver device; and
a controller configured to:
perform at least one of receiving, over the first wireless communication, communication setting information about the mobile terminal which is transmitted by the control of the controller and transmitting communication setting information about the image recording apparatus over the first wireless communication;
each time when the first wireless communication is established, receive a signal relating to a position of the mobile terminal over the first wireless communication;
based on a plurality of the received signals, create change information representative of a change of the position of the mobile terminal;
based on the created change information, set at least one setting value respectively for at least one setting item relating to the image recording of the image recording apparatus; and
control the recording device to record an image on the recording medium based on the image data received from the mobile terminal over the second wireless communication and based on the set at least one setting value.

8. A non-transitory storage medium storing a plurality of instructions executable by a computer of an image recording apparatus, the image recording apparatus comprising:
a recording device configured to record an image on a recording medium based on image data;
a first communication device configured to perform data communication with a mobile terminal over first wireless communication which is established when a distance between a transmitter device and a receiver device is equal to or less than a communicable distance;
a second communication device configured to perform data communication with the mobile terminal over second wireless communication which is established based on communication setting information about a transmitter device and a receiver device; and
the plurality of instructions, when executed by the computer, causing the image recording apparatus to execute:
perform at least one of receiving, over the first wireless communication, communication setting information about the mobile terminal and transmitting communication setting information about the image recording apparatus over the first wireless communication;
each time when the first wireless communication is established, receive a signal relating to a position of the mobile terminal over the first wireless communication;
based on a plurality of the received signals, create change information representative of a change of the position of the mobile terminal;
based on the created change information, set at least one setting value respectively for at least one setting item relating to the image recording of the image recording apparatus; and
control the image recording apparatus to record an image on the recording medium based on the image data received from the mobile terminal over the second wireless communication and based on the set at least one setting value.

9. A mobile terminal comprising:
a storage device configured to store image data;
a first communication device configured to perform data communication with an image recording apparatus over first wireless communication which is established when a distance between a transmitter device and a receiver device is equal to or less than a communicable distance;
a second communication device configured to perform data communication with the image recording apparatus over second wireless communication which is established based on communication setting information about a transmitter device and a receiver device;

a position detector configured to output a signal representative of a position of the mobile terminal; and
a controller configured to:
perform at least one of transmitting communication setting information about the mobile terminal over the first wireless communication and receiving communication setting information about the image recording apparatus over the first wireless communication;
transmit the image data stored in the storage device to the image recording apparatus over the second wireless communication;
each time when the first wireless communication is established, obtain a signal relating to a position of the mobile terminal which is output from the position detector;
based on a plurality of the obtained signals, create change information representative of a change of the position of the mobile terminal;
based on the created change information, set at least one setting value respectively for at least one setting item relating to the image recording of the image recording apparatus; and
transmit the set at least one setting value respectively for the at least one setting item to the image recording apparatus over one of the first wireless communication and the second wireless communication.

10. A non-transitory storage medium storing a plurality of instructions executable by a computer of a mobile terminal, the mobile terminal comprising:
a storage device configured to store image data;
a first communication device configured to perform data communication with an image recording apparatus over first wireless communication which is established when a distance between a transmitter device and a receiver device is equal to or less than a communicable distance;
a second communication device configured to perform data communication with the image recording apparatus over second wireless communication which is established based on communication setting information about a transmitter device and a receiver device; and
a position detector configured to output a signal representative of a position of the mobile terminal,
the plurality of instructions, when executed by the computer, causing the mobile terminal to:
perform at least one of transmitting communication setting information about the mobile terminal over the first wireless communication and receiving communication setting information about the image recording apparatus over the first wireless communication;
transmit the image data stored in the storage device to the image recording apparatus over the second wireless communication;
each time when the first wireless communication is established, obtain a signal relating to a position of the mobile terminal which is output from the position detector;
based on a plurality of the obtained signals, create change information representative of a change of the position of the mobile terminal;
based on the created change information, set at least one setting value respectively for at least one setting item relating to the image recording of the image recording apparatus; and
transmit the set at least one setting value respectively for the at least one setting item to the image recording apparatus over one of the first wireless communication and the second wireless communication.

11. A method of controlling an image recording system comprising a mobile terminal and an image recording apparatus configured to record an image on a recording medium, the mobile terminal comprising:
a storage device configured to store image data;
a mobile-terminal first communication device configured to perform data communication with the image recording apparatus over first wireless communication which is established when a distance between the mobile terminal and the image recording apparatus is equal to or less than a communicable distance;
a mobile-terminal second communication device configured to perform data communication with the image recording apparatus over second wireless communication which is established based on communication setting information about the mobile terminal and the image recording apparatus; and
a position detector configured to output a signal representative of a position of the mobile terminal,
the image recording apparatus comprising:
a recording device configured to record an image on the recording medium based on the image data;
an image-recording-apparatus first communication device configured to perform data communication with the mobile terminal over the first wireless communication; and
an image-recording-apparatus second communication device configured to perform data communication with the mobile terminal over the second wireless communication,
the method comprising:
executing a communication-setting-information transmitting processing in which the mobile-terminal first communication device and the image-recording-apparatus first communication device are controlled to perform at least one of transmitting the communication setting information about the mobile terminal from the mobile terminal to the image recording apparatus over the first wireless communication and transmitting the communication setting information about the image recording apparatus from the image recording apparatus to the mobile terminal over the first wireless communication;
executing an image-data transmitting processing in which the mobile-terminal second communication device and the image-recording-apparatus second communication device are controlled to transmit the image data stored in the storage device from the mobile terminal to the image recording apparatus over the second wireless communication;
executing a signal obtaining processing in which the signal relating to the position of the mobile terminal which is output from the position detector is obtained each time when the first wireless communication is established;
executing a setting processing in which change information representative of a change of the position of the mobile terminal is created based on a plurality of the signals obtained in the signal obtaining processing, and at least one setting value respectively for at least one setting item relating to the image recording of the image recording apparatus is set based on the created change information; and
executing an image recording processing in which the recording device is controlled to record an image on the recording medium based on the image data transmitted from the mobile terminal to the image recording apparatus in the image-data transmitting processing and based on the at least one setting value set in the setting processing.

* * * * *